March 22, 1960  D. L. LORENZ  2,929,331
TEMPERATURE COMPENSATED BEARINGS FOR GEAR PUMPS
Filed Jan. 11, 1957  2 Sheets-Sheet 1
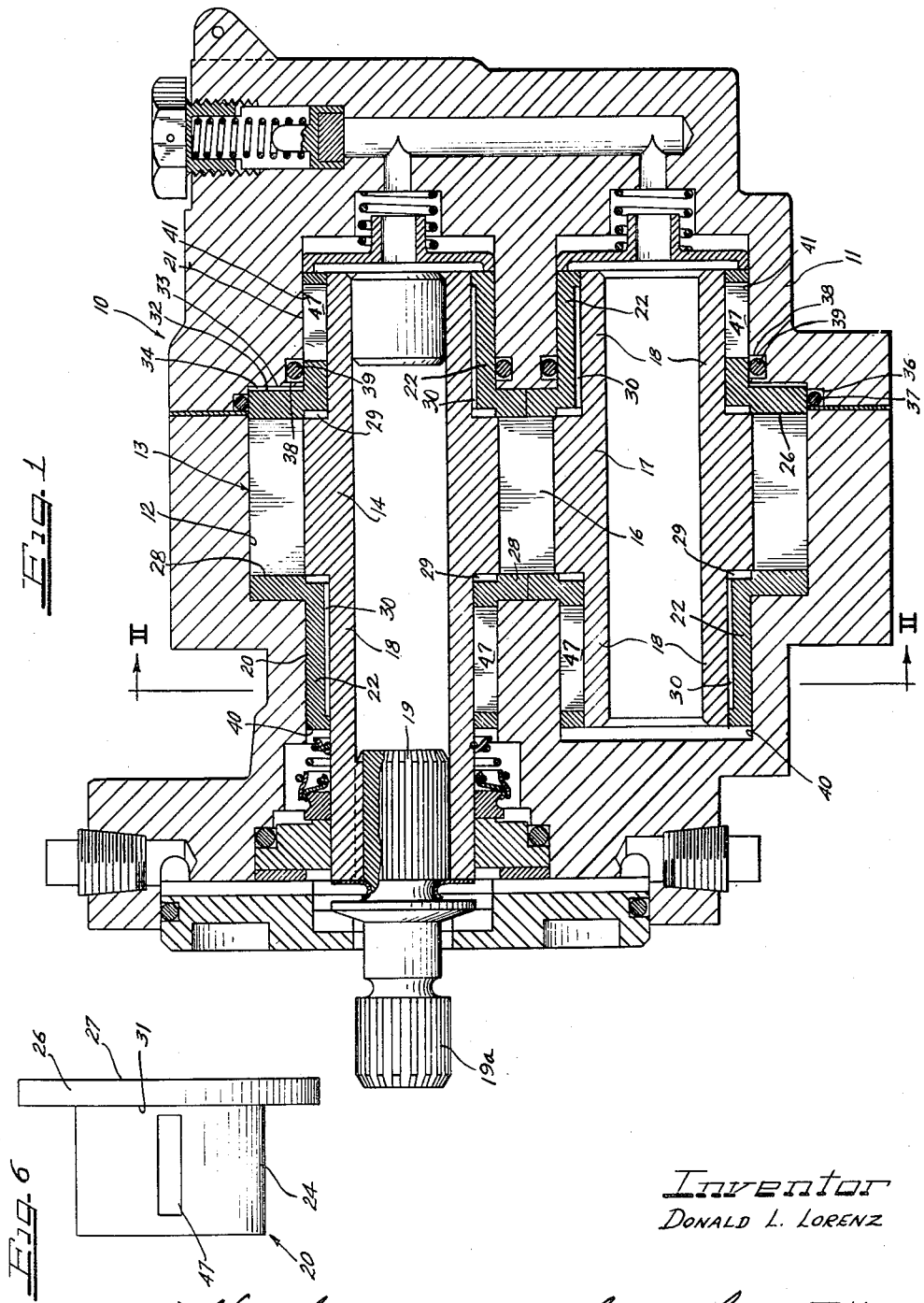
Inventor
DONALD L. LORENZ March 22, 1960 D. L. LORENZ 2,929,331
TEMPERATURE COMPENSATED BEARINGS FOR GEAR PUMPS
Filed Jan. 11, 1957 2 Sheets-Sheet 2
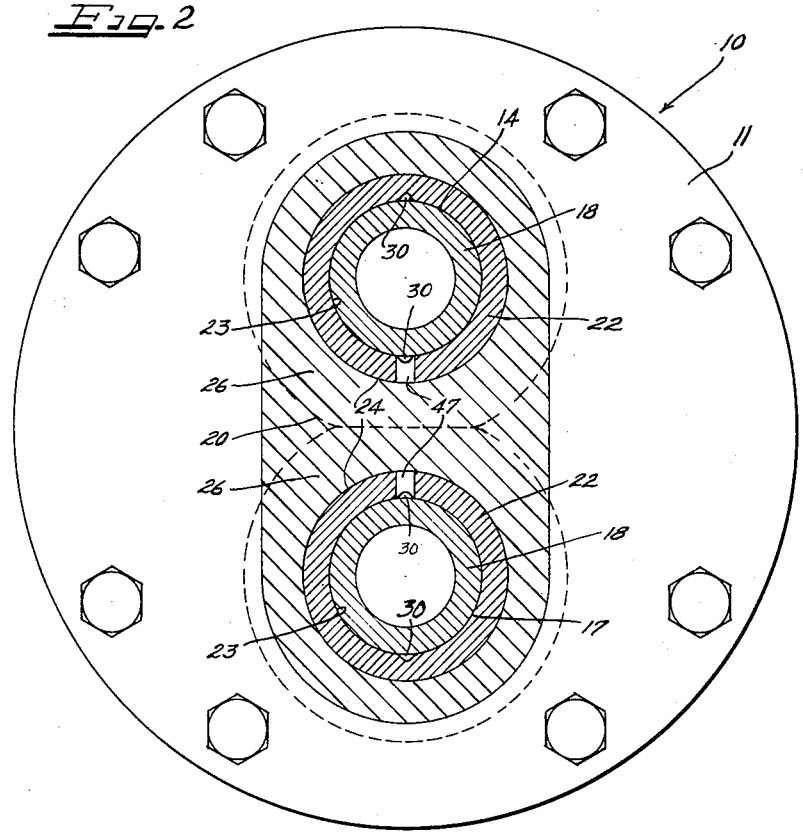
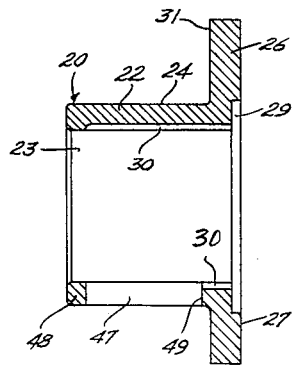 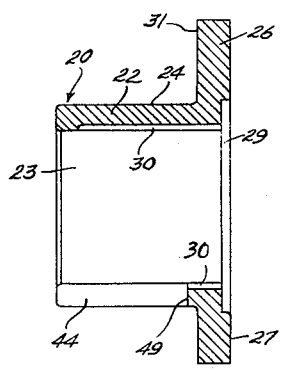 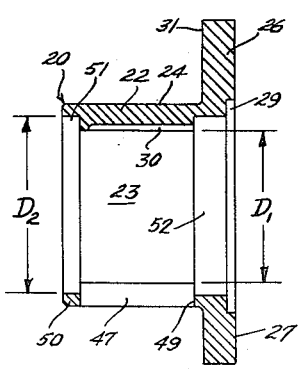
Inventor
DONALD L. LORENZ

United States Patent Office 2,929,331
Patented Mar. 22, 1960

2,929,331

TEMPERATURE COMPENSATED BEARINGS FOR GEAR PUMPS

Donald L. Lorenz, Euclid, Ohio, assignor to Thompson Ramo Wooldridge Inc., a corporation of Ohio Application January 11, 1957, Serial No. 633,781

7 Claims. (Cl. 103—126)

This invention relates generally to bearing constructions and more particularly relates to an improved form of temperature compensated bearings for a pressure-loaded gear pump.

A particularly useful application of a pressure-loaded gear pump is made as a fuel pump for the fuel system of jet engined aircraft. With the development of the jet engine aircraft, higher temperature operations are increasingly contemplated and environmental operating conditions are presented in connection with the provision of a pressure-loaded gear pump which involve differential thermal expansions between the gear, bearing and housing materials which are of serious moment.

It is an object of the present invention, therefore, to provide improved methods and means of controlling running clearances in bearing constructions.

Another object of the present invention is to provide a bearing construction which will, in effect, accommodate a "flow" of bearing material as higher temperatures are reached and the bearing material expands, rather than seize the journal for which the bearing surface is provided.

Another object of the present invention is to provide a temperature-compensated bearing for an aircraft fuel pump.

Still another object of the present invention is to provide temperature-compensated bearings for pressure-loaded gear pumps.

Many other advantages, features and additional objects of the present invention will become manifest to those versed in the art upon making reference to the detailed description which follows and the accompanying sheets of drawings in which a preferred structural embodiment of various exemplary bearings is shown and described.

On the drawings:

Figure 1 is a cross-sectional view of a pressure-loaded gear pump embodying the principles of the present invention;

Figure 2 is a cross-sectional view taken generally on line II—II of Figure 1;

Figures 3, 4 and 5 are cross-sectional detail views of alternative embodiments of specific bearing constructions embodying the principles of the present invention; and Figure 6 is an elevational view of the bearing of Figure 5.

As shown on the drawings:

An exemplary form of pump construction is indicated generally by the reference numeral 10 and comprises a housing or a casing 11 formed with a pumping chamber 12 provided in a conventional manner with an inlet and an outlet and including rotary fluid displacement means 13 operable in the pumping chamber 12 for moving fluid from the inlet to the outlet at increased pressure.

More specifically, the rotary fluid displacement means 13 comprise a driver gear 14 meshing as at 16 with a driven gear 17. Each of the gear members 14 and 17 have axially extending shaft extensions indicated by a common reference numeral 18 by means of which the gears 14 and 17 are journaled in the housing or casing 11.

The shaft extension 18 for the driver gear 14 is splined at one end to a stub shaft 19 adapted to be connected to a source of driving power as at 19a.

To journal and seal the rotary fluid displacement means 13, there is provided in accordance with the principles of the present invention a set of fixed and movable combination bearing and end plate members, sometimes referred to as bushings. The fixed bushings are indicated at 20 and the movable bushings are indicated generally at 21. Except for variations in certain characteristics which are not necessary to an understanding of the principles of the present invention, both the fixed and movable bushings can be considered as being of similar construction and, accordingly, for simplification of the disclosure and for clarity of understanding, like reference numerals will be applied to like portions of the respective fixed and movable bushings 20 and 21.

As best shown in Figures 3 to 6, each of the bushings 20 constitutes a generally tubular body portion 22 concentrically disposed relative to a longitudinal axis. A bore extends through the bushings 20 and the walls of the bore form a bearing surface 23 for journaling an adjoining surface of a gear shaft extension 18. An outside surface 24 on the outer peripheral area of the tubular body 22 seats in a bore or well provided in the casing or housing 11, thereby transmitting journaling forces to the casing or housing 11.

At one end of the bushing 20 a flange 26 extends radially outwardly of the outer surface 24. The front face of the flange 26 is indicated at 27 and forms a sealing face for engaging the adjoining side face 28 of a corresponding gear 14 or 17. The sealing face 27 is relieved as at 29 to assist in lubricating the face 27 and the bearing surface 23 as well as to relieve undue loading of the bearing surface 23 at the corner between the gear side face 28 and the shaft 18. A longitudinally extending lubrication groove 30 is cut into the bearing surface 23 from the relief groove 29 and terminates inwardly from the end of the tubular body 22, as shown, thereby to assist in conducting available coolant and lubricant over the bearing surface 23.

On the fixed bushings 20, a rear face 31 provided on the flange 26 merely engages against an adjoining surface of the casing or housing 11. On the movable bushings 21 this rear face identified at 32 in Figure 1 is spaced from an adjoining wall 33 of the housing or casing 11 and forms together with means including a portion of the casing or housing 11 a pressure control chamber 34 receiving pump-generated pressure to load the bushings into sealing engagement with the rotary fluid displacement means 13.

As shown in Figure 1, sealing means may be provided to seal the chamber 34 including a groove 36 receiving a sealing ring 37 engaging the outer peripheral surfaces of the flanges 26 of both the top and bottom bushings and grooves 38 receiving sealing rings 39 each engaging the outer surfaces 24 of the bushings.

As shown in Figure 1, the pump casing or housing 11 is provided with a pair of bores 40 which extend axially from the pumping chamber 12 to receive the fixed bushings 20.

Likewise, the pump casing or housing 11 is provided with a pair of bores 41 for receiving the movable bushings 21. Since the fixed bushings 20 can be virtually press-fitted in the corresponding bores 40, 40, the diameter of the outer surface 24 is sometimes referred to as the "pilot" diameter.

As higher temperature operations are approached, the differential thermal expansions between the gear, bearing and housing materials become serious. It is important, therefore, that the running clearances be controlled. In accordance with the principles of the present invention, such control is provided through a longitudinally extending slot formed in each bushing 20 or 21 and extending through the bushing in such a manner as to intersect both the outer surface 24 and the inner bearing surface 23.

In the embodiment of Figure 4, a longitudinally extending slot 44 is provided which extends from one end of the bushing 20 axially inwardly towards the flange 26 but terminating as at 49 closely adjacent the flange 26. Thus, the slot 44 is open at one end. As higher temperatures are reached and the bearing material expands, rather than seize the journal, the bearing in essence "flows" to the slotted area 44. Moreover, the improved construction thus provided also affords a method and means for controlling radial "close-in" due to the fitting of the "pilot" diameter into the corresponding bores of the casing or housing 11.

In the embodiment of Figure 3, a slot is indicated at 47 which extends through the bushing to intersect both the outer and inner surfaces 24 and 23, however, the slot 47 is formed intermediate the ends of the bushing 20 to provide a circumferentially continuous band or hoop 48 at one end of the bushing. At the other end of the slot 47, there is a shoulder 49 closely adjacent the flange 26.

The band or hoop 48 maintains the dimensions of the bushing intact and imparts more rigidity to the bushing than if the slot is open at one end as shown by the slot 44 in Figure 4. Nevertheless, the advantages of temperature control are fully provided by the intermediate slot arrangement, as shown at 47 in Figure 3.

The embodiment of Figure 5 is similar to the embodiment of Figure 3 except that the control band or hoop which is indicated by the reference numeral 50 in Figure 5 is made thinner, thereby illustrating a compromise adjustment between the control of bushing dimensions and the control of bushing temperature range. In other words, the diameter of the bearing surface 23 is indicated at $D_1$. An annular relief groove 51 is cut in the band or hoop 50 thereby providing an inner diameter for the band or hoop 50 which is larger or greater than the diameter $D_1$. The enlarged diameter of the band or hoop 50 is indicated at $D_2$. The bore 23 is also counterbored at 52 between the recess 29 and inner end of the bore. This counterbore spaces the bushing from the shaft 18 inside of the flange area of the bushing so that the tubular body 22 journals the shaft only between the groove 51 and counterbore 52. This further frees the bushing against seizure of the shaft under extreme heat conditions.

In Figure 1, the bushings 20 are illustrated as having their slots 47 through adjacent portions of the tubular bodies 22 thereof while the bushings 21 have their slots 47 through remote or outer portions of the bodies 22. The circumferential orientation of the slots can be selected as desired to provide maximum effectiveness without reduction of heavily loaded bearing areas.

Although various other minor modifications might be suggested by those versed in the art, it should be understood that I wish to embody within the scope of the patent warranted hereon all such modifications as reasonably and properly come within the scope of my contribution to the art.

I claim as my invention:

1. A bushing for a pump comprising a generally tubular member having a flange at one end, said flange having a radially extending front sealing face adapted to engage against the adjoining side face of a rotary fluid displacement means, said tubular member having a cylindrical bore extending therethrough and forming an inner bearing surface for journaling the rotary fluid displacement means, and an outer peripheral surface adapted to abut an adjoining pump casing, said tubular member having means forming an elongated slot extending radially from said inner bearing surface to said outer peripheral surface and having its longer dimension extending in an axial direction of the rotary fluid displacement means, thereby to control thermal expansion.

2. A bushing for a pump comprising a generally tubular member having a flange at one end, said flange having a radially extending front sealing face adapted to engage against the adjoining side face of a rotary fluid displacement means, said flange having a radially extending rear motive surface forming a wall of a pressure control chamber, said tubular member having a cylindrical bore extending therethrough and forming an inner bearing surface for journaling the rotary fluid displacement means, and an outer peripheral surface adapted to abut an adjoining pump casing, said tubular member having means forming an elongated slot extending radially from said inner bearing surface to said outer peripheral surface and having its longer dimension extending in an axial direction of the rotary fluid displacement means, thereby to control thermal expansion.

3. A pump comprising a casing having an inlet and an outlet and a pumping chamber therebetween, rotary fluid displacement means for pumping fluid from said inlet to said outlet, and a bushing in said casing having inner and outer surfaces forming a bearing surface for journaling said rotary fluid displacement means and a support surface for engaging an adjoining portion of said casing, a flange on said bushing extending radially outwardly of said outer surface and forming at one end of said bushing a sealing face for engaging the adjoining side face of the rotary fluid displacement means, said bushing having formed therein an elongated slot extending radially from said inner surface to said outer surface and having its longer dimension extending in an axial direction of the rotary fluid displacement means.

4. A pump comprising a casing having an inlet and an outlet and a pumping chamber therebetween, rotary fluid displacement means for pumping fluid from said inlet to said outlet, and a bushing in said casing having inner and outer surfaces forming a bearing surface for journaling said rotary fluid displacement means and a support surface for engaging an adjoining portion of said casing, a flange on said bushing extending radially outwardly of said outer surface and forming at one end of said bushing a sealing face for engaging the adjoining side face of the rotary fluid displacement means, said bushing having formed therein an elongated slot extending radially from said inner surface to said outer surface and having its longer dimension extending in an axial direction of the rotary fluid displacement means, said slot extending inwardly from the other end of said bushing but terminating short of said flange.

5. A pump comprising a casing having an inlet and an outlet and a pumping chamber therebetween, rotary fluid displacement means for pumping fluid from said inlet to said outlet, and a bushing in said casing having inner and outer surfaces forming a bearing surface for journaling said rotary fluid displacement means and a support surface for engaging an adjoining portion of said casing, a flange on said bushing extending radially outwardly of said outer surface and forming at one end of said bushing a sealing face for engaging the adjoining side face of the rotary fluid displacement means, said bushing having formed therein an elongated slot extending radially from said inner surface to said outer surface and having its longer dimension extending in an axial direction of the rotary fluid displacement means, said slot being formed intermediate said flange and the other end of said bushing, said bushing having a circumferentially continuous band at said other end to control the dimensions of said bushing.

6. A pump comprising a casing having an inlet and an outlet and a pumping chamber therebetween, rotary fluid displacement means for pumping fluid from said inlet to said outlet, and a bushing in said casing having inner and outer surfaces forming a bearing surface for journaling said rotary fluid displacement means and a support surface for engaging an adjoining portion of said casing, a flange on said bushing extending radially outwardly of said outer surface and forming at one end of said bushing a sealing face for engaging the adjoining side face of the rotary fluid displacement means, said bushing having formed therein an elongated slot extending radially from said inner surface to said outer surface and having its longer dimension extending in an axial direction of the rotary fluid displacement means, said slot being formed intermediate said flange and the other end of said bushing, said bushing having a circumferentially continuous band at said other end to control the dimensions of said bushing, said band being relieved to provide a greater inner diameter than the diameter of said inner bearing surface.

7. A pump bushing comprising a tubular member having an outturned flange at one end providing an end sealing face, counterbores in both ends of the member, said member having a shaft journaling bore between said counterbores, and an elongated slot through said member along the length of said shaft journaling bore extending radially from said bore to the outer surface of said tubular member and having its longer dimension extending in an axial direction from said outturned flange towards the end of said bushing, said slot and counterbores being effective to prevent the member from seizing a shaft journaled therein when heat expansion of the member would normally effect such seizure.

References Cited in the file of this patent
UNITED STATES PATENTS

| | | |
|---|---|---|
| Re. 14,922 | Prouty | July 20, 1920 |
| 873,097 | Sauer | Dec. 10, 1907 |
| 929,762 | Hess | Aug. 3, 1909 |
| 1,298,448 | Brassill | Mar. 25, 1919 |
| 2,420,622 | Roth et al. | May 13, 1947 |
| 2,696,172 | Compton | Dec. 7, 1954 |
| 2,701,743 | Mattingly et al. | Feb. 8, 1955 |
| 2,708,884 | Deschamps | May 24, 1955 |
| 2,730,960 | Krause | Jan. 17, 1956 |
| 2,789,512 | Kremser | Apr. 23, 1957 |

FOREIGN PATENTS

| | | |
|---|---|---|
| 24,495 | Great Britain | of 1908 |